United States Patent
Yu et al.

(10) Patent No.: US 9,104,089 B2
(45) Date of Patent: Aug. 11, 2015

(54) ELECTRONIC DEVICE

(71) Applicants: Sintai Optical (Shenzhen) Co., Ltd., Shenzhen (CN); Asia Optical International Ltd., Tortola (GB)

(72) Inventors: Chen-Ren Yu, Taichung (TW); Yi-Chung Hung, Taichung (TW); Wei-Ming Tseng, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (VG)

( * ) Notice: Subject to any disclaimer, the term of this patent is extended or adjusted under 35 U.S.C. 154(b) by 149 days.

(21) Appl. No.: 13/958,694

(22) Filed: Aug. 5, 2013

(65) Prior Publication Data

US 2014/0063474 A1 Mar. 6, 2014

(30) Foreign Application Priority Data

Aug. 31, 2012 (TW) .............................. 101131667 A

(51) Int. Cl.
| | | |
|---|---|---|
| *G03B 21/14* | (2006.01) | |
| *G03B 21/22* | (2006.01) | |
| *G03B 17/00* | (2006.01) | |
| *G03B 3/10* | (2006.01) | |
| *G02B 23/16* | (2006.01) | |
| *G03B 11/04* | (2006.01) | |

(52) U.S. Cl.
CPC *G03B 3/10* (2013.01); *G02B 23/16* (2013.01); *G03B 11/043* (2013.01)

(58) Field of Classification Search
CPC .... G03B 21/142; G03B 21/145; G03B 21/14; G03B 11/04; G03B 23/16; H04N 9/3197
USPC .................... 396/448; 353/119, 122
See application file for complete search history.

(56) References Cited

U.S. PATENT DOCUMENTS

| | | | |
|---|---|---|---|
| 6,334,718 B1* | 1/2002 | Akiba et al. ................... 396/448 |
| 2007/0206163 A1* | 9/2007 | Kuroda ........................... 353/88 |
| 2009/0168175 A1* | 7/2009 | Ishizuka ....................... 359/511 |
| 2009/0201470 A1* | 8/2009 | Kurita et al. ................... 353/119 |

* cited by examiner

*Primary Examiner* — William C Dowling
*Assistant Examiner* — Ryan Howard
(74) *Attorney, Agent, or Firm* — McClure, Qualey & Rodack, LLP

(57) ABSTRACT

An electronic device includes a lens assembly, a lens focusing rod, a power switch and a lens protective cover. When the lens protective cover is located in the first position, the lens assembly is shielded by the lens protective cover, the power switch is turned off, and the lens protective cover is separated from the lens focusing rod. When the lens protective cover is located in the second position, the power switch is turned on, and the lens protective cover is contacted with the lens focusing rod. When the lens protective cover is moved between the second position and the third position, the power switch is turned on, and the lens assembly is driven by the lens protective cover through the lens focusing rod for focusing operation.

10 Claims, 4 Drawing Sheets

ELECTRONIC DEVICE

BACKGROUND OF THE INVENTION

1. Field of the Invention

The invention relates to an electronic device, in particular relates to an electronic device in which the operation of a power switch and a lens assembly is actuated by movement of a lens protective cover.

2. Description of the Related Art

Pico projectors, which are much smaller and lighter than conventional projectors, provides conveniences of operation and storage, thus to be gradually evaluated in the present markets.

In order to reduce the manufacturing cost, some functions and components of a pico projector (e.g. a lens protective cover and a power switch) are omitted. On the other hand, if these functions and components are not omitted, the increasing of cost, volume and design complexity of the pico projector are inevitable.

BRIEF SUMMARY OF THE INVENTION

In order to solve the above-described issues, the invention provides an electronic device, which includes a lens assembly, a lens focusing rod, a power switch and a lens protective cover. The lens focusing rod connected to the lens assembly is utilized to drive the lens assembly to move along an optical axis for focusing operation. The lens protective cover is movable in a direction perpendicular to the optical axis between a first position, a second position and a third position, in which when the lens protective cover is located in the first position, the lens assembly is shielded by the lens protective cover, the power switch is turned off, and the lens protective cover is separated from the lens focusing rod; when the lens protective cover is located in the second position, the power switch is turned on, and the lens protective cover is contacted with the lens focusing rod; and when the lens protective cover is moved between the second position and the third position, the power switch is turned on, and the lens assembly is driven by the lens protective cover through the lens focusing rod for the focusing operation.

The invention provides a correlation of operation between the lens protective cover, the power switch and the lens assembly, wherein the lens protective cover is slid away to turn on the electronic device and the focusing operation is automatically performed after the electronic device is turned on. Accordingly, a delicate electronic device designed of simple mechanism can be provided for consumers without increasing costs and volume thereof.

According to the electronic device of the invention, the lens assembly comprises a convex pin, the lens focusing rod is rotatable, and the lens focusing rod is provided with an arc-shaped slot utilized to accommodate the convex pin of the lens assembly, so that the lens assembly is driven by the lens focusing rod to move along the optical axis when the lens focusing rod is rotated.

The electronic device further comprises a frame, in which the lens assembly is connected to the frame and movable along the optical axis, and the lens focusing rod is rotatably connected to the frame.

The electronic device further comprises a spring which is disposed on the frame and propped up the lens focusing rod, so that the lens focusing rod is kept in contact with the lens protective cover when the lens protective cover is moved between the second position and the third position.

The spring can be a torsion spring or a leaf spring.

The electronic device further comprises a cover plate fixed on the frame, so that the lens focusing rod is limited to rotate on the frame.

The lens assembly can comprise a convex pin, the lens focusing rod is provided with an arc-shaped slot, and the cover plate is provided with a groove, in which the convex pin of the lens assembly is accommodated in the arc-shaped slot of the lens focusing rod and the groove of the cover plate.

The lens focusing rod can comprise a protruded portion, and the lens protective cover comprises a convex block, in which the lens focusing rod is activated by the lens protective cover by utilizing the convex block of the lens protective cover to prop up the protruded portion of the lens focusing rod.

The power switch can be a contact or non-contact type switch.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The invention is applicable not only to pico projectors, but to other electronic devices provided with lens assemblies, such as normal-sized projectors, cameras and mobile phones. In the invention, the operation of a power switch and a lens assembly is actuated by movement of a lens protective cover. Specifically, the electronic device is turned on by sliding away the lens protective cover thereof, and the focusing operation is automatically performed after the electronic device is turned on.

Figure 1:
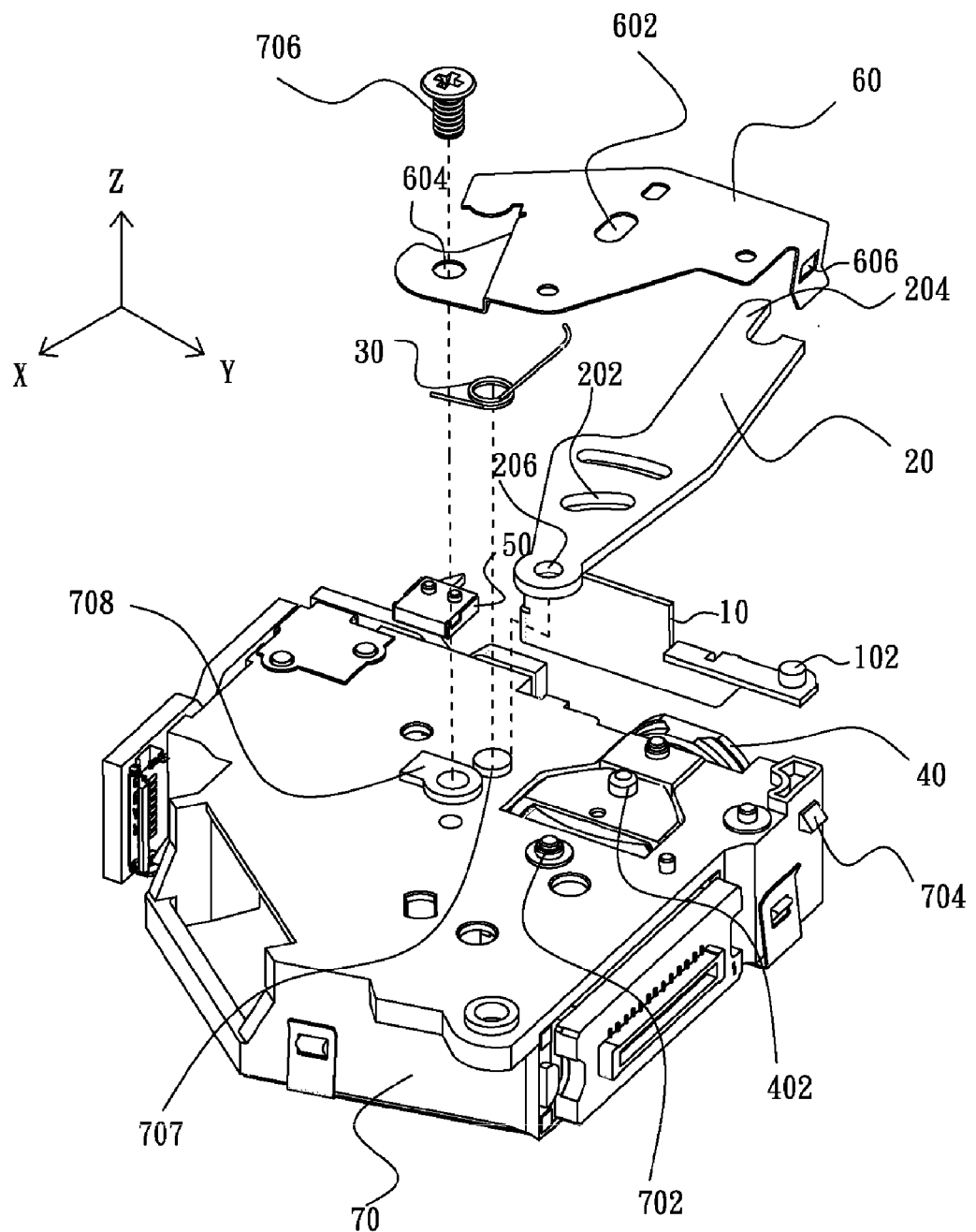
FIG. 1 is a perspective exploded view of an electronic device of the invention.

Referring to FIG. 1, the electronic device of the invention includes a frame 70, a cover plate 60, a power switch 50, a lens assembly 40, a spring 30, a lens focusing rod 20 and a lens protective cover 10, which are described in detail in the following:

The lens assembly 40 installed in the frame 70 is movable along an optical axis (i.e., the positive and negative X directions) thereof in focusing operation. The lens assembly 40 comprises a convex pin 402.

The lens focusing rod 20 is installed on the frame 70, with a shaft part 702 fitted in a shaft hole 206, so that the lens focusing rod 20 can be rotated about the shaft part 702 of the frame 70. The lens focusing rod 20 is provided with a curved slot 202 and a protruded portion 204, in which the convex pin 402 of the lens assembly 40 is penetrated through the curved slot 202.

Figure 2:
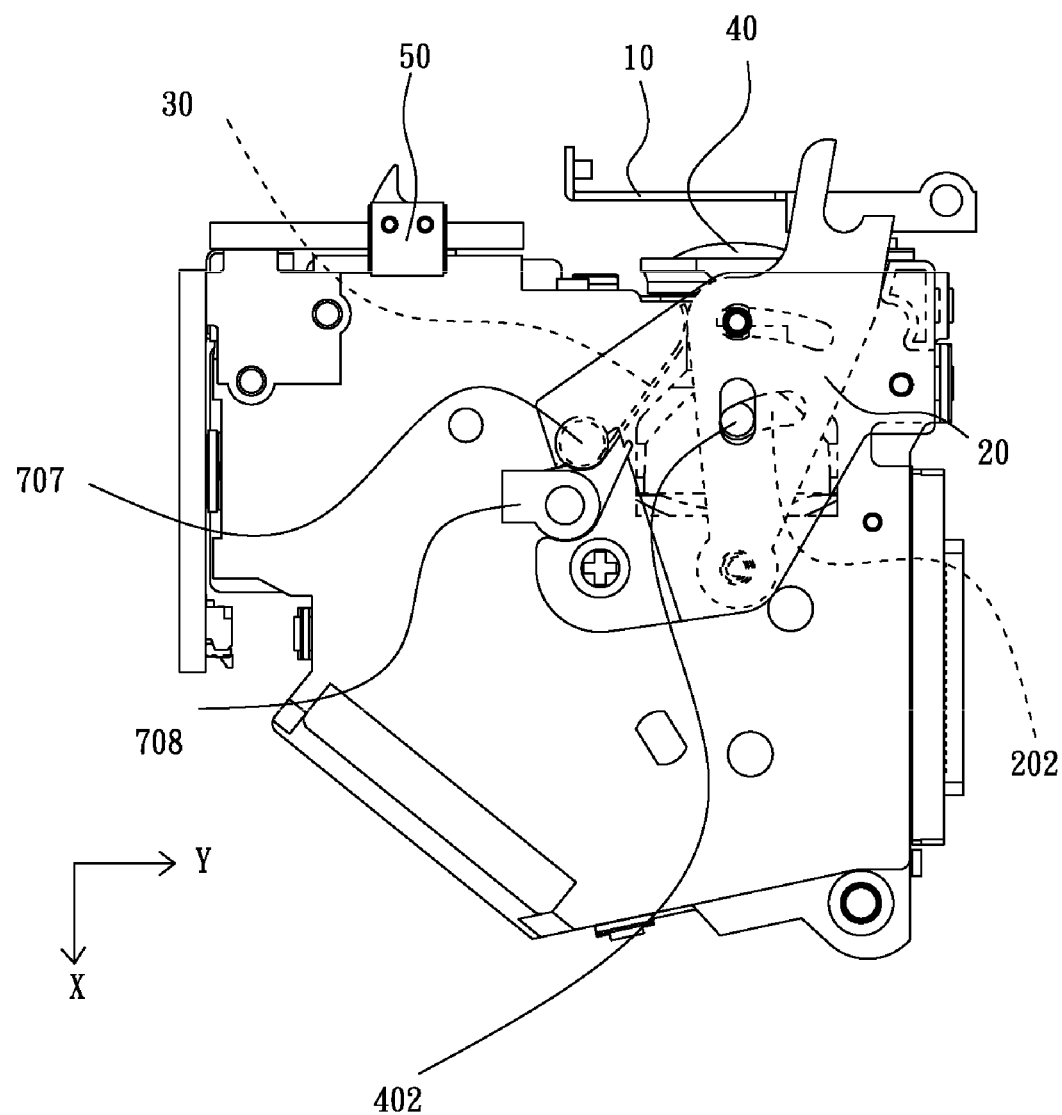
FIGS. 2, 3 and 4 illustrate operations of an electronic device of the invention.

The spring 30 can be a torsion spring (as shown in FIG. 1) or a leaf spring (not shown). Referring also to FIG. 2, the spring 30 is kept in position by an installation part 707 of the frame 70, with one end of the spring 30 propped up the lens focusing rod 20, and the other end of the spring 30 propped up a connecting seat 708 of the frame 70.

The cover plate 60 is fixed on the frame 70 to cover both of the lens focusing rod 20 and the spring 30. The cover plate 60 is provided with a circular hole 604 and an opening 606. In the fixation operation, a convex lug 704 of the frame 70 is engaged in the opening 606 of the cover plate 60, and the cover plate 60 is fixed on the frame 70 by fastening a screw 706 to the connecting seat 708 of the frame 70 through the circular hole 604 of the cover plate 60. The cover plate 60 is further provided with a groove 602 which is capable of receiving the convex pin 402 of the lens assembly 40.

The electronic device of the invention further includes a lens protective cover 10 and a machine casing (not shown in FIGs.), in which the machine casing is utilized to accommodate or support the above-described components, and the lens protective cover 10 installed on the machine casing is capable of moving in the positive or negative Y direction. The lens protective cover 10 comprises a convex block 102.

The power switch 50 is installed on the machine casing. In this embodiment, the power switch 50 is a contact type switch, capable of being turned on by contact pressure of the lens protective cover 10. However, it is understood that the power switch 50 can be a non-contact type switch composed of, for example, piezoelectrical material and a copper foil plate.

Figure 3:
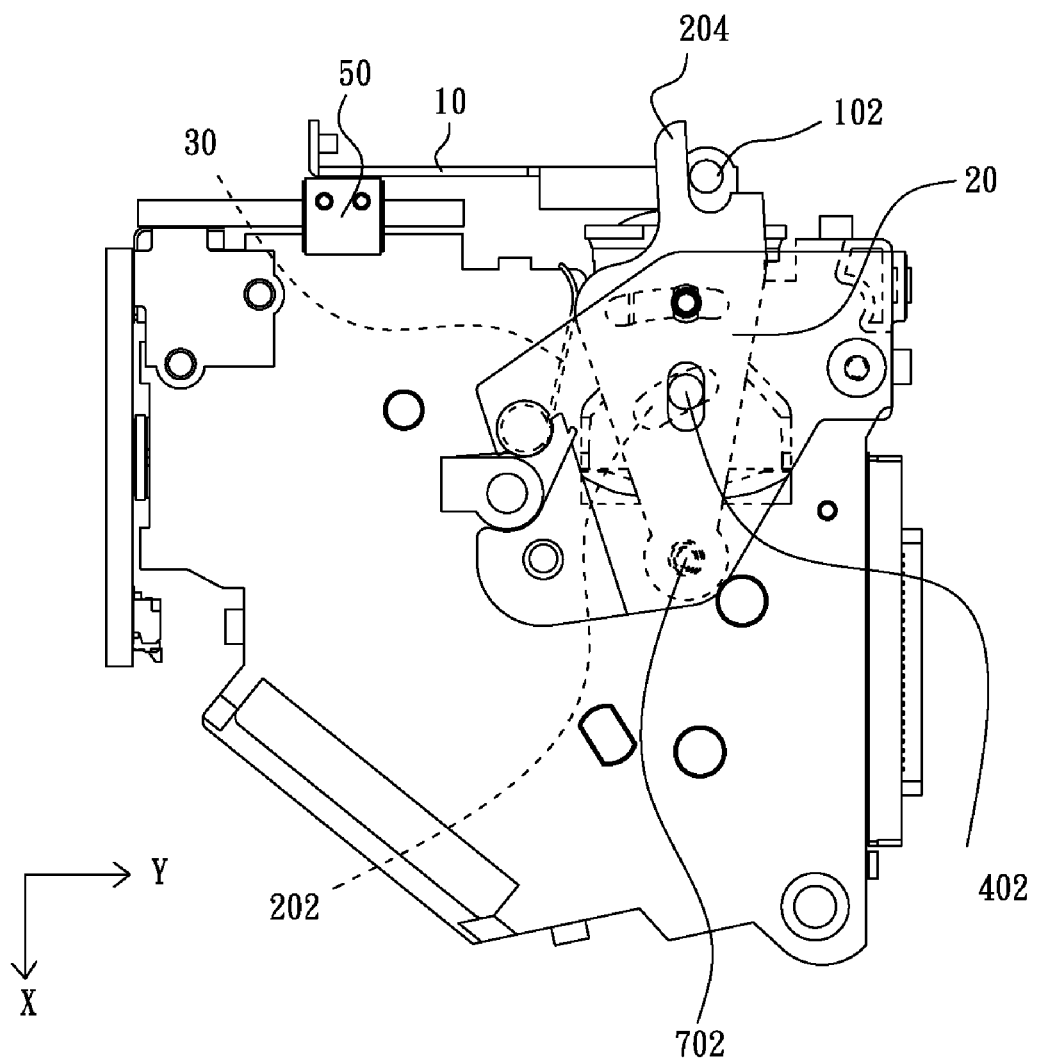
Figure 4:
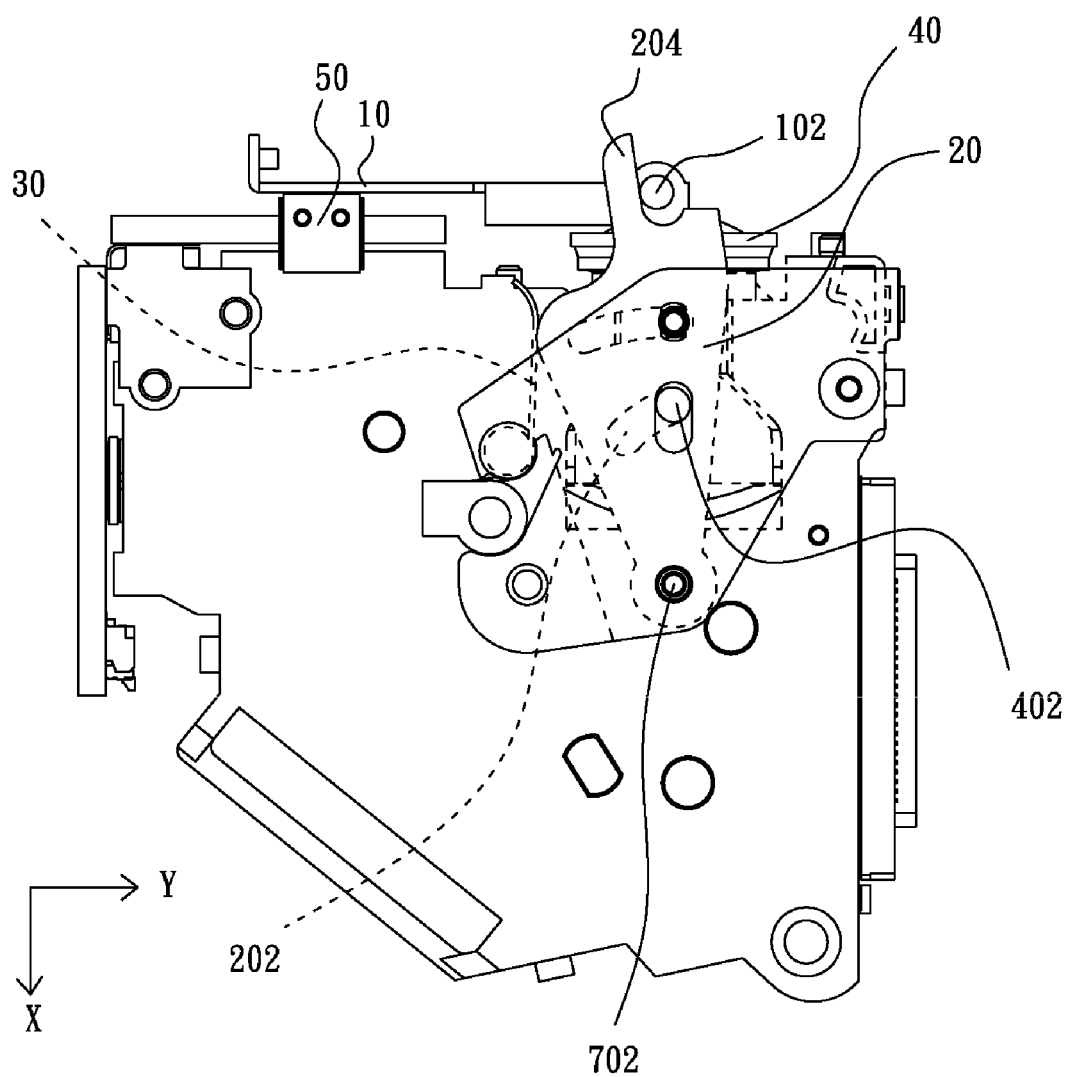

FIGS. 2, 3 and 4 illustrate operations of the electronic device of the invention, wherein the lens protective cover 10 can be moved by a user in a direction (i.e., the positive and negative Y directions) perpendicular to the optical axis among a first position (FIG. 1), a second position (FIG. 2) and a third position (FIG. 3).

Initially, all the components are arranged as shown in FIG. 2, wherein the lens assembly 40 is shielded by the lens protective cover 10 to avoid dust, and the power switch 50 is turned off.

When the lens protective cover 10 is pushed by the user to slide in the negative Y direction and contact the power switch 50 (as shown in FIG. 3), the power switch 50 is turned on, and the convex block 102 of the lens protective cover 10 is contacted with the protruded portion 204 of the lens focusing rod 20.

A continuous push by the user on the lens protective cover 10 enables the convex block 102 of the lens protective cover 10 to start pushing the protruded portion 204 of the lens focusing rod 20, the lens focusing rod 20 is rotated about the shaft part 702 of the frame 70, and the spring 30 is deformed by the pushing of the lens focusing rod 20; meanwhile, because the convex pin 402 of the lens assembly 40 is pushed by an inner wall of the arc-shaped slot 202 of the lens focusing rod 20, the lens assembly 40 is driven to start moving in the negative direction for a focusing stroke. The focusing stroke of the lens assembly 40 is ended when the lens assembly 40 is fully protruded (shown in FIG. 4).

When the operation of the lens assembly 40 is finished, the lens assembly 40 can be returned to the initial position and the power switch 50 can be turned off merely by moving the lens protective cover 10 in the positive X direction. It is noted that, due to the restoring force of the spring 30, the protruded portion 204 of the lens focusing rod 20 is kept in contact with the convex block 102 of the lens protective cover 10 in the return process of the lens assembly 40.

In conclusion, the invention provides a correlation of operation between the lens protective cover, the power switch and the lens assembly, wherein the lens protective cover is slid away to turn on the electronic device and the focusing operation is automatically performed after the electronic device is turned on. Accordingly, a delicate electronic device designed of simple mechanism can be provided for consumers without increasing costs and volume thereof.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An electronic device, comprising:
   a lens assembly;
   a lens focusing rod connected to the lens assembly and utilized to drive the lens assembly to move along an optical axis for focusing operation;
   a power switch;
   a lens protective cover movable in a direction perpendicular to the optical axis between a first position, a second position and a third position, in which when the lens protective cover is located in the first position, the lens assembly is shielded by the lens protective cover, the power switch is turned off, and the lens protective cover is separated from the lens focusing rod; when the lens protective cover is located in the second position, the power switch is turned on, and the lens protective cover is contacted with the lens focusing rod; and when the lens protective cover is moved between the second position and the third position, the power switch is turned on, and the lens assembly is driven by the lens protective cover through the lens focusing rod for the focusing operation.

2. The electronic device as claimed in claim 1, wherein the lens assembly comprises a convex pin, the lens focusing rod is rotatable, and the lens focusing rod is provided with an arc-shaped slot utilized to accommodate the convex pin of the lens assembly, so that the lens assembly is driven by the lens focusing rod to move along the optical axis when the lens focusing rod is rotated.

3. The electronic device as claimed in claim 1 further comprising a frame, in which the lens assembly is connected to the frame and movable along the optical axis, and the lens focusing rod is rotatably connected to the frame.

4. The electronic device as claimed in claim 3 further comprising a spring which is disposed on the frame and pushes against the lens focusing rod, so that the lens focusing rod is kept in contact with the lens protective cover when the lens protective cover is moved between the second position and the third position.

5. The electronic device as claimed in claim 4, wherein the spring is a torsion spring or a leaf spring.

6. The electronic device as claimed in claim 3 further comprising a cover plate fixed on the frame, so that the lens focusing rod is limited to rotate on the frame.

7. The electronic device as claimed in claim 6, wherein the lens assembly comprises a convex pin, the lens focusing rod is provided with an arc-shaped slot, and the cover plate is provided with a groove, in which the convex pin of the lens assembly is accommodated in the arc-shaped slot of the lens focusing rod and the groove of the cover plate.

8. The electronic device as claimed in claim 1, wherein the lens focusing rod comprises a protruded portion, and the lens protective cover comprises a convex block, in which the lens focusing rod is activated by the lens protective cover by utilizing the convex block of the lens protective cover to push against the protruded portion of the lens focusing rod.

9. The electronic device as claimed in claim 1, wherein the power switch comprises a contact type switch.

10. The electronic device as claimed in claim 1, wherein the power switch comprises a non-contact type switch.

* * * * *